United States Patent
Cox et al.

(10) Patent No.: US 7,774,311 B2
(45) Date of Patent: Aug. 10, 2010

(54) METHOD AND APPARATUS OF DISTRIBUTING DATA IN PARTIONED DATABASES OPERATING ON A SHARED-NOTHING ARCHITECTURE

(75) Inventors: Philip S. Cox, Thornhill (CA); Leo Lau, Thornhill (CA); Adil M. Sardar, Markham (CA); David Tremaine, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/175,373

(22) Filed: Jul. 17, 2008

(65) Prior Publication Data

US 2010/0017429 A1    Jan. 21, 2010

(51) Int. Cl.
*G06F 7/00* (2006.01)
(52) U.S. Cl. ...................................... 707/636
(58) Field of Classification Search ............. 707/10
See application file for complete search history.

(56) References Cited

U.S. PATENT DOCUMENTS

| | | | |
|---|---|---|---|
| 5,689,698 A | 11/1997 | Jones et al. | |
| 5,857,180 A | 1/1999 | Hallmark et al. | |
| 5,970,495 A * | 10/1999 | Baru et al. | 707/102 |
| 5,983,213 A | 11/1999 | Nakano et al. | |
| 6,144,970 A | 11/2000 | Bonner et al. | |
| 6,609,131 B1 | 8/2003 | Zait et al. | |
| 6,615,219 B1 | 9/2003 | Bruso et al. | |
| 6,732,084 B1 | 5/2004 | Kabra et al. | |
| 7,085,769 B1 | 8/2006 | Luo et al. | |
| 7,225,444 B1 * | 5/2007 | Yung et al. | 718/106 |
| 7,284,017 B2 | 10/2007 | Baune | |
| 7,509,359 B1 | 3/2009 | Bruso et al. | |
| 2004/0215640 A1 | 10/2004 | Bamford et al. | |
| 2005/0555351 | 3/2005 | Barton et al. | |
| 2005/0086269 A1 | 4/2005 | Chen et al. | |
| 2006/0004838 A1 | 1/2006 | Shodhan et al. | |
| 2007/0260650 A1 | 11/2007 | Warner et al. | |
| 2008/0155221 A1 | 6/2008 | Bireley et al. | |
| 2009/0024578 A1 | 1/2009 | Wang et al. | |

OTHER PUBLICATIONS

Easy SQL, "If Record Exists, Update It. If Not, Insert It.", available online at disturbedbuddha.wordpress.com/2007/11/29/easy-sql-if-record-exists-it-if-not-insert-it/ (posted Nov. 29, 2007).*

* cited by examiner

*Primary Examiner*—Tony Mahmoudi
*Assistant Examiner*—Jensen Hu

(57) ABSTRACT

The invention relates to a method and apparatus of distributing data in portioned databases operating on a shared-nothing architecture. The invention provides two independent streams of data, where a first stream sends table data, and the second stream sends LOB data, to a receiving partition. The receiving partition re-couples the LOB data with the table data. Using two independent streams to distribute LOB data can increase data redistribution since large amounts of input/output is not performed to handle the sending of LOB data in a coupled fashion.

1 Claim, 2 Drawing Sheets

METHOD AND APPARATUS OF DISTRIBUTING DATA IN PARTIONED DATABASES OPERATING ON A SHARED-NOTHING ARCHITECTURE

The disclosure relates to and cross-references co-pending application Ser. No. 11/847,306, entitled "Apparatus and Method to Decouple Large Object Data Processing From Main-Line Data Processing in a Shared-Nothing Architecture", which was filed on Aug. 29, 2007, the disclosure of which is incorporated herein in its entirety for background information.

BACKGROUND

1. Field of the Invention

This invention relates generally to parallel database systems and more particularly to a method and apparatus for distributing data in a table across a group of nodes of a parallel database system. The invention is useful in relational database systems, particularly in statically partitioned systems.

2. Description of Related Art

Database systems increasingly rely upon parallelism to achieve high performance and large capacity. Rather than relying upon a single monolithic processor, parallel systems exploit fast and inexpensive microprocessors to achieve high cost effectiveness and improved performance. The popular shared-memory architecture of symmetric multiprocessors is relatively easy to parallelize, but cannot scale to hundreds or thousands of nodes, due to contention for the shared memory by those nodes.

Shared-nothing parallel systems, on the other hand, interconnect independent processors via high-speed networks. Each processor stores a portion of the database locally on its disk. These systems can scale up to hundreds or even thousands of nodes, and are the architecture of choice for today's data warehouses that typically range from tens of terabytes to over one hundred terabytes of online storage. High throughput and response times can be achieved not only from inter-transaction parallelism, but also from intra-transaction parallelism for complex queries.

Relational tables in such databases are distributed over one or more database partitions, where each partition resides on one physical machine in a cluster of physical machines. The location of rows in a table portioned in this way is determined by a distribution function that maps row data to a partition number. In such a system, it may occasionally be desirable to modify this distribution function. The most common reasons for doing so are (1) the current database manager capacity is inconsistent with current or future business requirements and thus physical machines need to be added or removed from the database cluster, and (2) the existing distribution of data across database partitions has become non-uniform or inconsistent with the processing power of the physical machines on which the database partitions are stored.

Whenever the data distribution function is modified, it is necessary to redistribute existing table data among the database partitions according to a new distribution function. When large-object (LOB) data is present in a table that needs to undergo data redistribution, ideally one would like to avoid sending the LOB data for each outgoing record along with the record data itself, as this method produces a slower data redistribution operation that can be CPU intensive. In some cases, the CPU may even stall while large amounts of data input/output is performed to handle the sending of LOB data.

A method has been proposed in application Ser. No. 11/847,306 to "de-couple" the sending of LOB data from the sending of regular table data so that the LOB data is essentially handled in a parallel stream that does not stall the mainline data processing stream. This method is specifically for architectures where, for each LOB value associated with a row, references to the location of the data chunks that comprise the LOB value are embedded in the row itself. These references will hereinafter be referred to as "LOB descriptors".

One significant drawback of the method described in application Ser. No. 11/847,306 is that it requires receiving database partitions to allocate space for an incoming LOB value before the sending partition can begin to send the LOB data for that LOB value. Furthermore, the receiver must send the resulting LOB allocation descriptor for the LOB value to the sender before it can begin sending so that when the sender is sending LOB data to the receiver, the sender can include information about where to store each block of data on the receiver. By having the sender send the information that indicates where each block on the sender should be located on the receiver, the LOB data processing is effectively de-coupled from the non-LOB data processing.

It is important to note that this method involves a rather complicated protocol between sender and receiver that results in extra communication steps and is also not optimal from a performance standpoint as the sender may have resources to send LOB data but may be stalled waiting for the receiver to send the LOB descriptor for a particular LOB value.

Thus, there is a need for an improved method and apparatus of de-coupling LOB data from regular data during data redistribution.

SUMMARY

In one embodiment, the invention relates to a method of distributing data in partitioned databases operating on a shared-nothing architecture. The method includes: assigning an identifier to a large-object (LOB) data, the identifier including a partition ID, a list ID, a record number, and a LOB row value ID; transmitting the LOB data and the identifier to a receiving database through a first data stream; transmitting a table data to the receiving database through a second data stream, the second data stream independent from the first data stream and parallel with the first data stream; receiving the LOB data, the identifier, and the table data at the receiving database; checking a mapping table at the receiving database to determine if the identifier is present in the mapping table; coupling the LOB data with a row data associated with the identifier if the identifier is present in the mapping table; and creating an entry in the mapping table associated with the identifier if the identifier is not present in the mapping table.

BRIEF DESCRIPTION OF THE DRAWINGS

These and other embodiments of the invention will be discussed with reference to the following non-limiting and exemplary illustrations, in which like elements are numbered similarly, and where.

DETAILED DESCRIPTION

Figure 1:
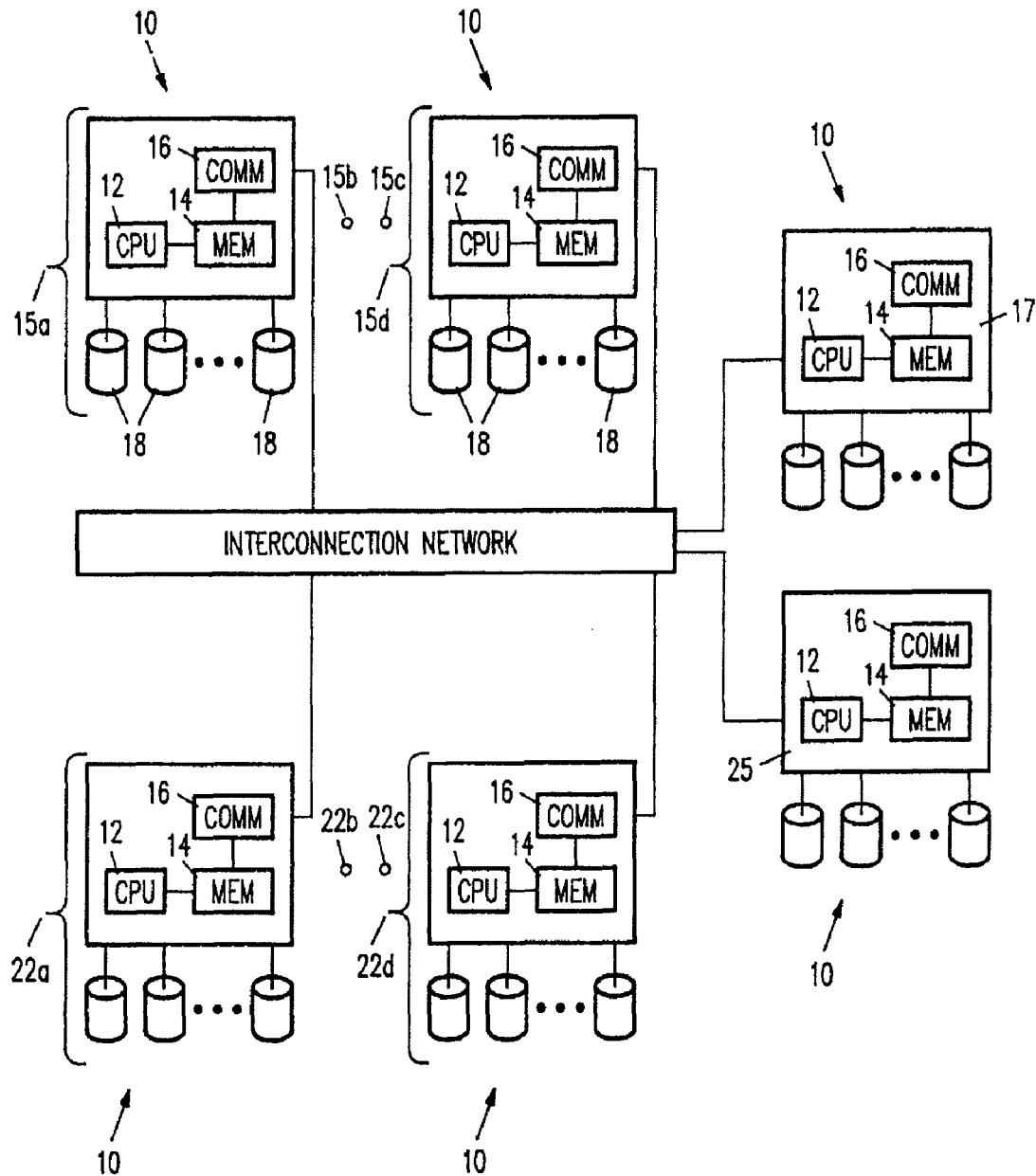
FIG. 1 depicts a prior art database having the shared-nothing distributed architecture.

With reference to FIG. 1, which depicts a prior art database having the shared-nothing distributed architecture, the database is configured to have a plurality of logical sites, each generally designated as 10. Each logical site has a central processor unit 12 or CPU, a cache of local main memory 14, and a communication adaptor 16 through which the logical site communicates with the interconnection network 20. One or more disk drives, collectively designated as 18, are for local storage The configuration of FIG. 1 further illustrates a plurality of logical sites designated as storage sites 22. The storage sites act as mass storage units from which the data files to be sorted originate. More than one storage site may be required in very large database systems storing large volumes of data.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention.

Figure 2:
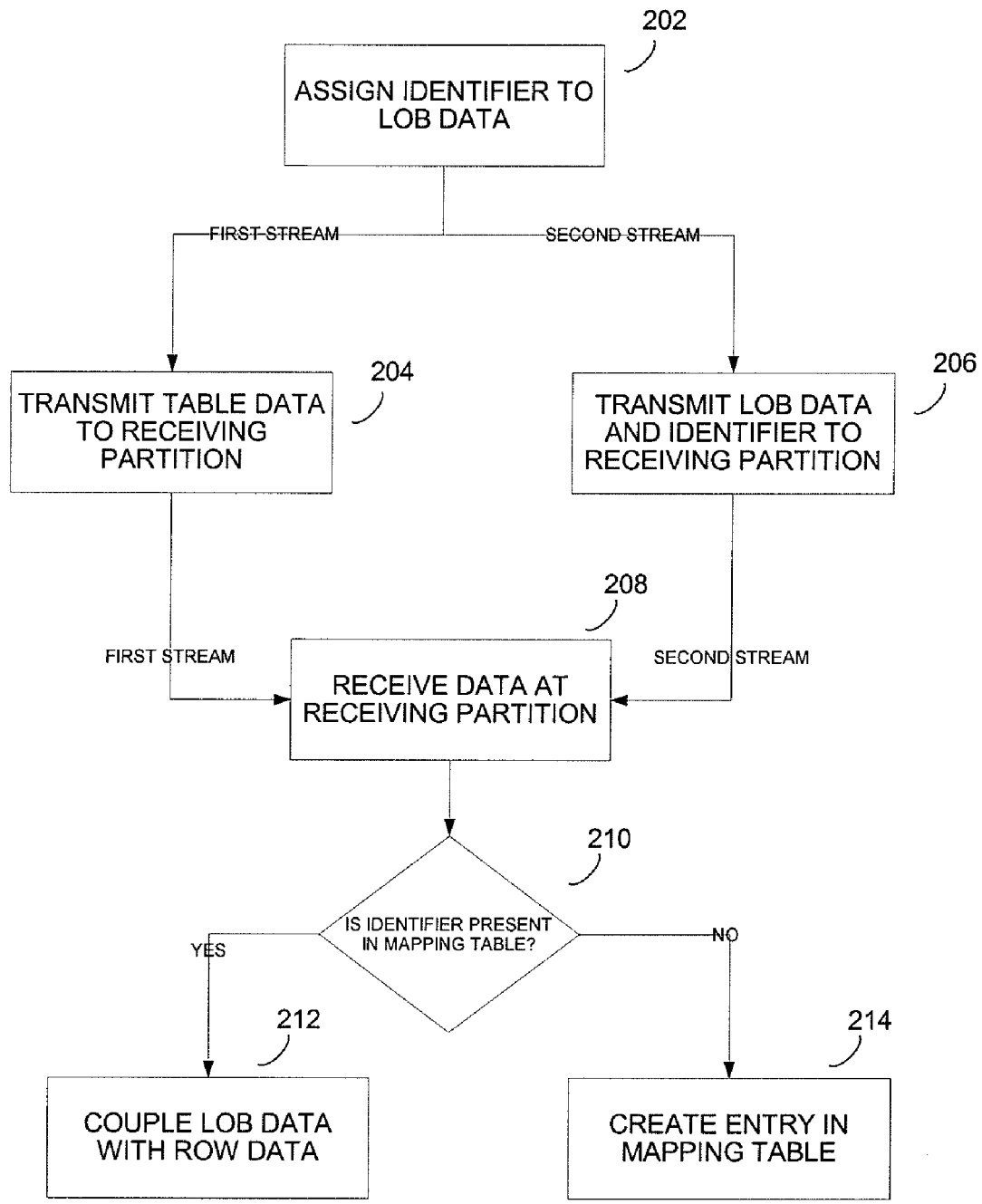
FIG. 2 is a flowchart illustrating the process of redistributing data on a shared-nothing architecture in accordance with an exemplary method of the present invention.

FIG. 2 is a flowchart illustrating the process of redistributing data on a shared-nothing architecture in accordance with an exemplary method of the present invention.

The process begins at step 202, where an identifier, known as a surrogate LOB ID (SLID), is assigned to LOB data. The identifier can include a partition ID, a list ID, a record number, and a LOB row value ID. In an embodiment of the present invention, the partition ID is the sending database partition's partition ID. The list ID is a counter for each receiving database partition, which is maintained by a Data Extractor Sender (DES) task on the sending database partition. The DES scans the data table and groups outgoing records into lists such that there is one list for each receiving partition. The record number is the record number of the transmitted data table within the list ID. Finally, the LOB row value ID is the ordinal number of the LOB data within the particular row. For example, if a table has 4 LOB columns, then each row contains 4 LOB values. A LOB row value ID of 0 corresponds to the first LOB value in the row, a LOB row value ID of 1 corresponds to the second LOB value in the row, and so on.

For example, in an embodiment of the present invention, if the data table being redistributed has four LOB columns, the sending partition ID is 12, and the list ID value assigned to the list is 45. The SLID for the third LOB value of row 10 in the list will be <12, 45, 10, 3.>. The identifier uniquely identifies the LOB value on all partitions in the database.

At step 204, the table data is sent to the receiving database partition through the First Stream, which is a non-LOB data processing stream. Furthermore, the list is passed to a LOB sender task (LS) that handles the processing of LOB data in a separate processing stream, depicted as the Second Stream in FIG. 2.

At step 206, the LOB data and identifier is sent to the receiving database partition through the Second Stream, which is a LOB data processing stream. The LS works in parallel to the non-LOB processing stream. When the LS receives an outgoing record list from the DES, the LS iterates over the list and for each LOB value in each outgoing row, the LS sends the corresponding LOB data to the receiving database partition through the Second Stream. The LS sends the SLID of each LOB value along with its data when it sends the data to the receiving database partition so that the receiving database partition recognizes which LOB value the received LOB data is associated with.

At step 208, the receiving database partition receives the LOB data, the identifier, and the table data. At the receiving database partition, a mapping table, such as a Surrogate LOB ID mapping table (SLIDM) is maintained. The SLIDM maps a SLID to the LOB descriptor that indicates where LOB data for the LOB value corresponding to the SLID should be stored. The SLIDM can consist of <SLID, {LOB descriptor}> pairs, and entries can be added to the SLIDM during two concurrently executing processing streams that execute on the receiving database partitions. As described above, the First Stream receives and processes incoming lists of non-LOB record table data, and the Second Stream receives and processes incoming LOB data.

In the First Stream, a Data Receiver task (DR) receives lists of records from sending database partitions and passes each list to a Data Writer task (DW). When a DW receives a record list, it attempts to allocate space for each LOB value associated with each data record in the list. LOB allocations are based on the allocation information in the record that is received from the sending database partition.

At step 210, prior to attempting an allocation for a LOB value, the DW uses the SLID, which it derives from the list ID for the record list, to search the SLIDM to determine if an allocation for the LOB has previously taken place on the partition. If an entry is found in the SLIDM, this indicates that the LOB has already been allocated by the LOB processing stream, which is described below.

At step 212, the LOB descriptor stored in the SLIDM is retrieved and copied into the row, replacing the allocation information from the sender. This process re-couples the LOB data with its data row in the table.

However, if an entry for the SLID is not found in the SLIDM, then at step 214, the DW creates an entry in the SLIDM for the SLID. The DW then allocates space for the LOB, embeds the new LOB descriptor in the row, and adds the LOB descriptor to the SLIDM so that the LOB descriptor can be found by the LOB processing stream when the LOB processing stream receives the corresponding LOB data from the sending partition.

In the Second Stream, a Lob Receiver task (LR) receives LOB data from sending database partitions and passes the data to a LOB Writer task (LW) for writing. The LOB data is labeled with a SLID, which is received from the sending database partition as described above. The LW searches the SLIDM based on the SLID to determine if space has already been allocated for the LOB value. At step 210, if an entry in the SLIDM is found for the SLID, then the LOB descriptors in the SLIDM are used to determine where to store the LOB data on the partition and the LOB data is re-coupled with its corresponding data row.

However, if an entry for the SLID if not found in the SLIDM, then the corresponding data row has not yet been processed by the non-LOB processing stream as described above. The LW creates an entry in the SLIDM, and then allocates space for the LOB value and stores the resulting LOB description in the SLIDM so that the LOB descriptor will be in the SLID for any DW that needs to process the corresponding data record for the LOB in the future.

While the specification has been disclosed in relation to the exemplary and non-limiting embodiments provided herein, it is noted that the inventive principles are not limited to these embodiments and include other permutations and deviations without departing from the spirit of the invention.

What is claimed is:

1. A method of distributing data in partitioned databases operating on a shared-nothing architecture, the method comprising:

assigning an identifier to a large-object (LOB) data, the identifier including a partition ID, a list ID, a record number, and a LOB row value ID;

transmitting the LOB data and the identifier to a receiving database through a first data stream;

transmitting a table data to the receiving database through a second data stream, the second data stream independent from the first data stream and parallel with the first data stream;

receiving the LOB data, the identifier, and the table data at the receiving database;

checking a mapping table at the receiving database to determine if the identifier is present in the mapping table;

coupling the LOB data with a row data associated with the identifier if the identifier is present in the mapping table;

creating an entry in the mapping table associated with the identifier if the identifier is not present in the mapping table; and allocating memory space to each LOB value associated with each data record on the list ID;

wherein the first data stream and the second data streams are transmitted substantially simultaneously and wherein the identifier is used to re-couple transmitted data.

* * * * *